United States Patent
Pletschacher

(10) Patent No.: US 6,363,923 B1
(45) Date of Patent: Apr. 2, 2002

(54) OXYGEN ENRICHMENT DEVICE FOR THE COMBUSTION AIR OF INTERNAL COMBUSTION ENGINES

(75) Inventor: Alexander Pletschacher, Teisendorf (DE)

(73) Assignee: Christine Pletschacher, Teisendorf (DE)

( * ) Notice: Subject to any disclaimer, the term of this patent is extended or adjusted under 35 U.S.C. 154(b) by 0 days.

(21) Appl. No.: 09/582,544

(22) PCT Filed: Oct. 26, 1999

(86) PCT No.: PCT/DE99/03425

§ 371 Date: Jul. 11, 2000

§ 102(e) Date: Jul. 11, 2000

(87) PCT Pub. No.: WO00/25014

PCT Pub. Date: May 4, 2000

(30) Foreign Application Priority Data

Oct. 28, 1998 (DE) .......................................... 198 49 791

(51) Int. Cl.[7] .............................................. F02B 23/00
(52) U.S. Cl. ............................. 123/585; 55/406; 95/35
(58) Field of Search ............................. 123/585; 95/35; 55/406, 407, 404

(56) References Cited

U.S. PATENT DOCUMENTS

| 2,593,294 A | * | 4/1952 | Goldberg | 55/406 |
| 4,265,648 A | * | 5/1981 | Wedege | 55/409 |
| 4,292,051 A | * | 9/1981 | Kime | 95/35 |
| 5,149,345 A | * | 9/1992 | Bouchard et al. | 55/406 |
| 5,553,591 A | | 9/1996 | Yi | |

FOREIGN PATENT DOCUMENTS

| DE | 30 18 634 A1 | 11/1981 |
| DE | 42 01 423 A1 | 7/1993 |
| DE | 94 01 276.8 | 4/1994 |
| DE | 195 45 397 A1 | 6/1997 |
| DE | 195 43 884 C2 | 2/1998 |
| EP | 0 237 816 | 9/1987 |
| EP | 0 394 494 | 10/1991 |
| EP | 0 569 413 B1 | 1/1992 |

* cited by examiner

Primary Examiner—Noah P. Kamen
(74) Attorney, Agent, or Firm—Davis & Bujold, P.L.L.C.

(57) ABSTRACT

An apparatus for enriching oxygen in the combustion air of internal-combustion engines has a gas centrifuge (1) which is driven by an exhaust gas turbine (2) in the exhaust pipe (4)

20 Claims, 2 Drawing Sheets

OXYGEN ENRICHMENT DEVICE FOR THE COMBUSTION AIR OF INTERNAL COMBUSTION ENGINES

This invention relates to an apparatus for enriching oxygen in the combustion air of internal-combustion engines by means of a gas centrifuge.

BACKGROUND OF THE INVENTION

Since increased oxygen content in the air can increase burnup rate and thereby increase power or reduce fuel consumption, there have for some time been efforts to operate internal-combustion engines with oxygen-enriched combustion air.

It is thus known from DE 195 43 884 C2 to enrich oxygen in the air by gas diffusion through a membrane. Since oxygen can be enriched sufficiently with such a membrane only at low engine speed, the known apparatus has a pressure tank providing compressed oxygen-enriched air for high speeds. The known apparatus thus involves considerable equipment expense.

DE 195 45 397 A1 also discloses an apparatus according to the preamble of claim 1. It proposes a multistage, electrically driven gas centrifuge which can enrich oxygen content to preferably 99%. However this print does not suggest how to achieve such oxygen enrichment economically.

In airplanes it is known to increase power temporarily by replacing combustion air by nitrous oxide, which has an oxygen content of 33% unlike air with an oxygen content of 21 vol % versus 78 vol % of nitrogen. In conventional motor vehicles, however, nitrous oxide cannot replace air if only for logistical reasons, but also because of the increased price and equipment expense.

The problem of the invention is therefore to provide combustion air having a sufficiently high degree of oxygen enrichment for an internal-combustion engine independently of speed economically without any great equipment expense.

SUMMARY OF INVENTION

According to the invention, the gas centrifuge for enriching oxygen in the combustion air is driven by an exhaust gas turbine. The kinetic energy of the exhaust gases which is otherwise lost is thus utilized for driving the gas centrifuge. The inventive apparatus thus permits economical operation.

The speed of the gas centrifuge enriching the oxygen content of the combustion air, and thus the increase in charging efficiency, i.e. in the oxygen-enriched air mass entering the cylinders, is thus linked with engine speed via the exhaust gas medium. This means that with rising engine speed and thus a rising flow rate of exhaust gas, the rotor speed of the gas centrifuge and thus the charging efficiency of oxygen-enriched combustion air to the cylinders rises.

It is favorable for realization of the inventive apparatus that exhaust gas turbines with high continuous speeds of 240000 rpm are available for turbocharging.

However, gas centrifuge speeds of e.g. 80000 revolutions per minute already suffice to achieve an oxygen enrichment of combustion air with an oxygen content of 33 vol % and more corresponding to nitrous oxide for example.

This will be illustrated by the following calculation based on a gas centrifuge having a rotor axially flowed through by combustion air in a cylinder interior.

At atmospheric pressure, i.e. on the rotor axis where no centrifugal force acts on the particles, particle number density $n_o$ of a gas, i.e. the number of particles per unit of volume, is $$n_o = \rho_o/m \quad (1)$$

where $\rho$ is the density of the gas at atmospheric pressure and m the mass of a molecule of the gas.

For nitrogen ($N_2$) with $\rho_o = 1.2505 \cdot kg \cdot m^{-3}$ and $m = 4.65175067 \cdot 10^{-26} \cdot k$, particle number density $n_o$ ($N_2$) resulting on the rotor axis is thus $$n_o(N_2) = 1.2505 \cdot kg \cdot m^{-3} / 4.65175097 \cdot 10^{-26} \cdot kg$$
$$= 2.688235051 \cdot 10^{25} \ m^{-3}$$
$$= 1.000596565 \cdot N_L$$

where $N_L$ is the Loschmidt number with $N_L = 2.68663 \cdot 20^{25} \cdot m^{-3}$.

For oxygen $O_2$ with $\rho_o = 1.429 \ kg \cdot m^3$ and $m = 5.31362901 \cdot 10^{-26}$ kg the particle number density resulting on the rotor axis is thus $$n_o(O_2) = 1.000996982 \cdot N_L.$$

With increasing radius r from the rotor axis the resulting particle number density for nitrogen $n(N_2)$ is $$n(N_2) = 1.000596565 \cdot N_L \cdot \exp\{(6.7656339 \cdot 10^{-8} \cdot k \cdot (N_2)) \cdot [n_2]^2 \cdot r^2 \cdot m^{-2}\}$$

while the particle number density for oxygen is $$n(O_2) = 1.000996982 \cdot N_L \cdot \exp\{(7.7255698 \cdot 10^{-8} k(O_2)) \cdot [n_2]^2 \cdot r^2 \cdot m^{-2}\}$$

where the exponential term in curly brackets results from the Maxwell-Boltzmann distribution law.

In accordance with the radius from the rotor axis of the gas centrifuge one thus obtains for nitrogen and oxygen in the air the particle number densities shown in the diagram according to FIG. 1. The divergent curves for oxygen ($O_2$) and nitrogen ($N_2$) in this diagram document successive increasing relative separation of oxygen and nitrogen molecules with increasing distance from the rotor axis at a rotor speed of 80000 revolutions per minute. That is, at this rotor speed and a radius of 7.5 centimeters of the rotor or the cylinder interior of the gas centrifuge, the particle number density of oxygen in the air increases from about $0.5 \cdot 10^{25}$ $m^{-3}$ on the rotor axis to about $2.7 \cdot 10^{25} \ m^{-3}$, i.e. more than five times, but for nitrogen from about $2.0 \cdot 10^{25} \ m^{-3}$ to about $8.7 \ 10^{25} \ m^{-3}$, i.e. only 4.4 times. That is, at a speed of 80000 revolutions per minute and a cylinder interior radius of 7.5 centimeters, the oxygen content on the cylinder interior wall is about 40 vol % versus 20 vol % in the air supplied to the gas centrifuge.

With the inventive apparatus one can thus readily obtain a power increase in the engine corresponding to that caused by supplying nitrous oxide.

While in engines operated with normal combustion air the share of incompletely burnt hydrocarbons rises at higher speed because there is not enough time for complete combustion, the inventive apparatus ensures with its enriched oxygen content in the combustion air that complete combustion takes place even at higher speeds, thereby clearly reducing the pollutant content, in particular the CO content, the content of soot particles and similar non- or only partly oxidized carbon compounds.

It is evident that even greater oxygen enrichment can be achieved at a further increase in speed of the rotor of the gas centrifuge and/or an increasing radius of the cylinder interior of the gas centrifuge, so that the content of nitrogen oxides in the exhaust gas can ultimately also be reduced over conventional engines, as well as ozone formation, which is attributed in particular to nitrogen oxides as the precursor substances.

BRIEF DESCRIPTION OF THE DRAWINGS

The following examples will serve to illustrate the invention further, whereby.

DESCRIPTION OF THE PREFERRED EMBODIMENTS

Figure 3:
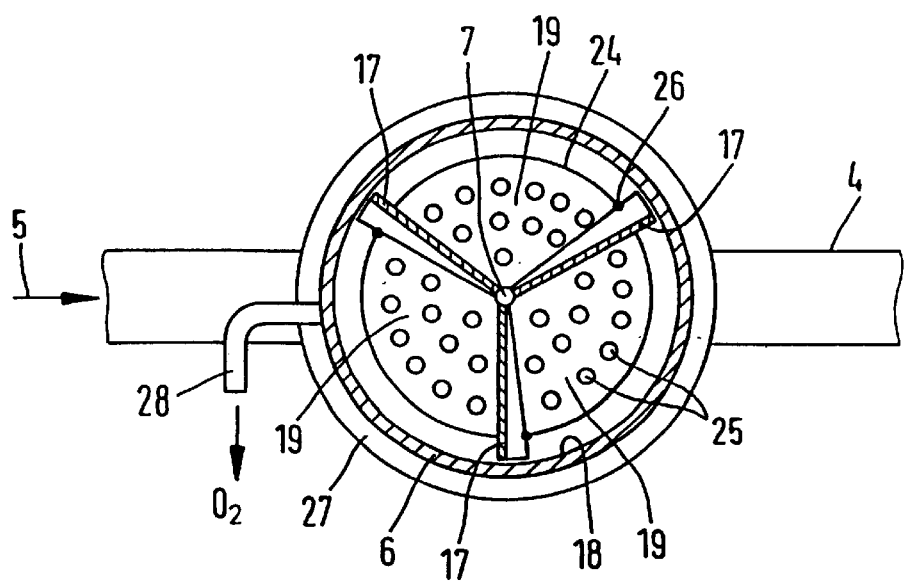
FIG. 3 shows a section through the gas centrifuge along line III—III according to FIG. 2.
Figure 2:
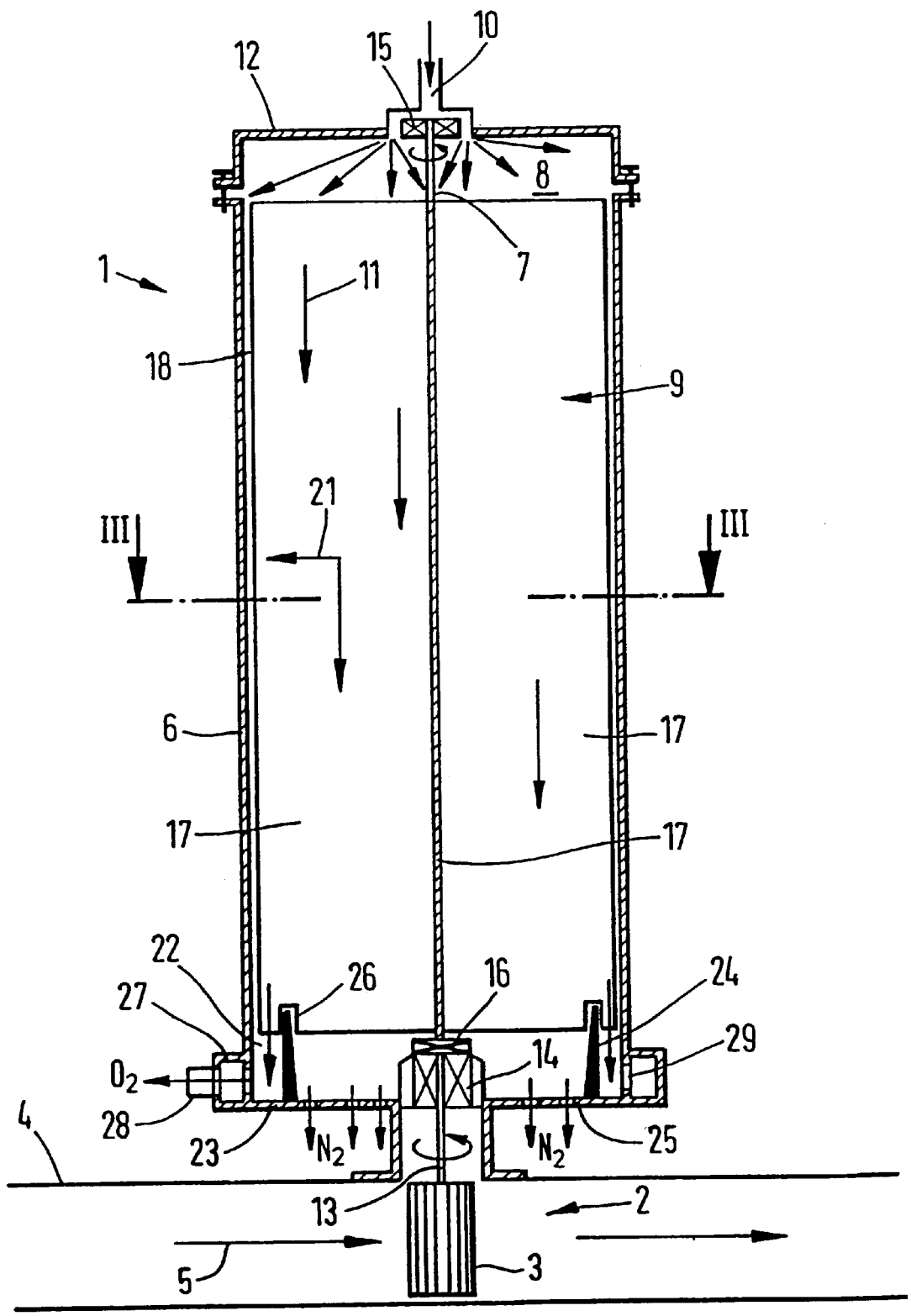
FIG. 2 shows schematically a longitudinal section of an embodiment of the inventive apparatus.

According to FIGS. 2 and 3 the apparatus for enriching oxygen in the combustion air of an internal-combustion engine (not shown) has gas centrifuge 1 which is driven by exhaust gas turbine 2. Turbine wheel 3 of exhaust gas turbine 2 is disposed for this purpose in exhaust pipe 4 of the internal-combustion engine, being driven by the combustion exhaust gases of the internal-combustion engine which are shown by arrows 5.

Housing 6 of gas centrifuge 1 is flanged to exhaust pipe 4 in such a way that the longitudinal axis of gas centrifuge 1 is disposed perpendicular to the longitudinal axis of exhaust pipe 4.

Pivotally mounted in cylinder interior 8 of gas centrifuge 1 is rotor 9 which is flowed through axially by combustion air shown by arrows 11 and entering interior 8 on one end wall 12 via centric inlet opening 10.

Rotation axis 7 of rotor 9 is thus likewise perpendicular to the longitudinal axis of exhaust pipe 4. It at the same time extends coaxially to rotation axis 13 of exhaust gas turbine 2 whose turbine wheel 3 is flowed against radially by exhaust gas 5. Radial and axial bearings 14, 15, 16 are provided for mounting rotor 9 on both sides.

Rotor 9 has e.g. three blades 17 extending from rotation axis 7 to cylinder interior wall 18 so far that only a gap receiving tolerances arises on interior wall 18. This forms chambers 19 between blades 17 and interior wall 18 which are flowed through by combustion air 11. Air in chambers 19 circulates in accordance with the rotational speed of rotor 9 so that the centrifugal force shown by arrow 21 acts on the molecules in the air in chambers 19, the consequence being that oxygen in combustion air 11 is enriched increasingly with the distance from rotation axis 7, i.e. in the area of cylinder wall 18, as explained above in connection with the diagram according to FIG. 1.

So as to ensure a sufficient time of action of centrifugal force, blades 17 have accordingly great length in the axial direction. Their axial length is preferably greater than the radius of cylinder interior 8, in particular more than twice as great as the rotor radius.

It is self-evident that interior 8 need not necessarily be cylindrical in form but may also have another rotationally symmetric form, e.g. be more or less strongly conic in form. The axial length of blades 17 should then be at least greater than the greatest radius of rotor 9.

Figure 1:
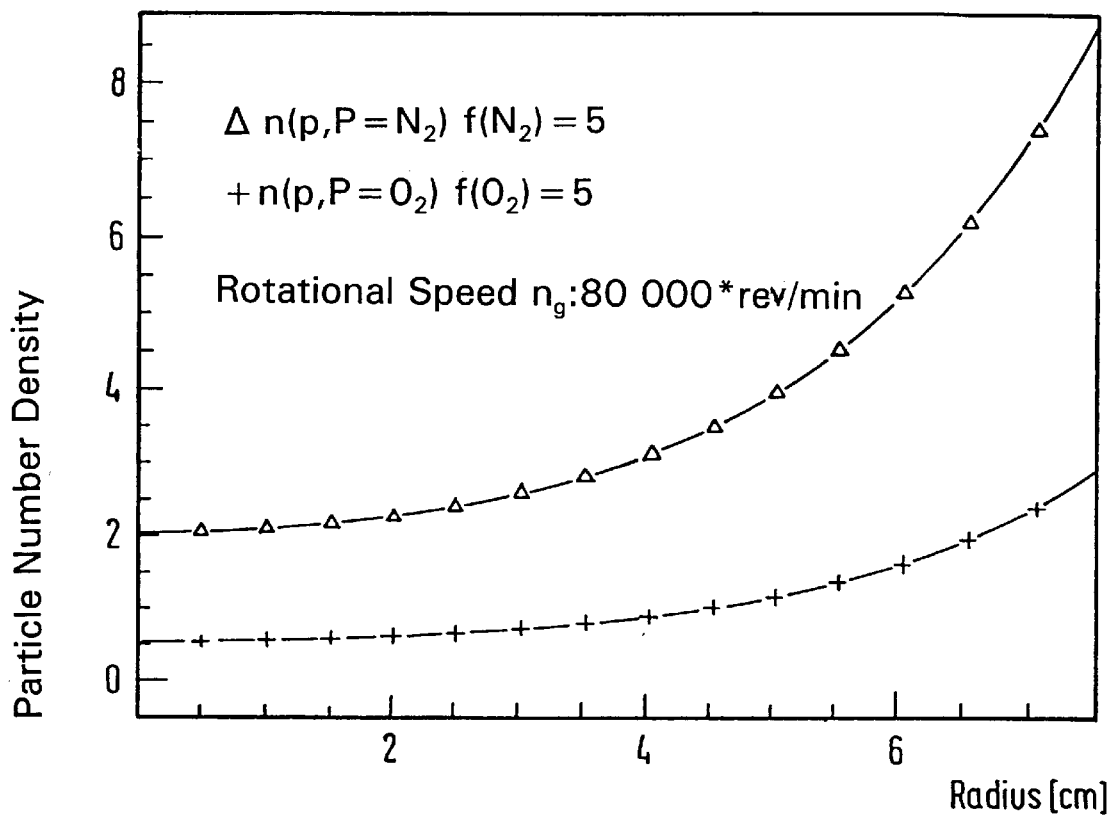
FIG. 1 shows a diagram plotting oxygen enrichment of the air at a given rotor speed of the gas centrifuge in accordance with radius.

Disposed on cylinder interior wall 8 on the outlet-side axial end of the gas centrifuge is annular receiving channel 22 for oxygen-enriched combustion air, designated "$O_2$", to enter. To form receiving channel 22 concentric partition 24 is fastened to relevant end wall 23 of housing 6. Oxygen-depleted, i.e. nitrogen-rich, air, which is designated "$N_2$" in FIG. 1, is released into the atmosphere through outlet openings 25 provided in end wall 23 between receiving channel 22 and rotor axis 7. In order to seal receiving channel 22 from the nitrogen-richer, radially inner area with outlet openings 25, blades 17 have slots 26 into which partition 24 protrudes.

Oxygen-enriched combustion air 02 enters ring channel 27 through ports 29 in cylinder wall 18 and flows to the engine via pipe 28 connected to ring channel 27.

To increase air flow through gas centrifuge 1 and thus the oxygen-enriched air mass entering the cylinders of the engine, rotor blades 17 are disposed on a slight slant relative to rotor axis 7, as shown in FIG. 3. Instead one can also provide an additional propeller on rotor axis of rotation 7 while rotor blades 17 can be of axis-parallel form.

What is claimed is:

1. An apparatus (1) for enriching an oxygen content of combustion air for an internal-combustion engine, the apparatus comprising a gas centrifuge (1) having a rotor (9) rotatably located within a housing (6) of the apparatus, the rotor (9) being connected to an exhaust gas turbine (2), the exhaust gas turbine (2) communicating with combustion exhaust gases (5) of the internal-combustion engine, and the combustion exhaust gases (5) of the internal-combustion engine driving the exhaust gas turbine (2) during operation of the internal-combustion engine;

wherein the rotor (9) has a plurality of blades (17) located for rotation within an interior of the housing (6) and the housing (6) defines a diameter in the interior where the plurality of blades rotate, and the plurality of blades have an axial length which is greater than the diameter of the interior of the housing where the plurality of blades rotate, whereby the rotor (9), during operation of the internal-combustion engine, rotates and applies a centrifugal force to combustion air, as the combustion air flows axially along the rotor (9), to force oxygen-enriched combustion air ($O_2$) radially away from a rotational axis (7) of the rotor (9) and facilitate separation of the oxygen-enriched combustion air ($O_2$) from a remainder of the combustion air.

2. The apparatus according to claim 1, wherein the axial length of the plurality of blades (17) is greater than twice the diameter of the interior of the housing where the plurality of blades rotate.

3. The apparatus according to claim 1, wherein the plurality of blades (17) of the rotor (9) and an interior wall (18) of the housing (6) divide the gas centrifuge (1) into a plurality of chambers (19) through which the combustion air flows during operation of the internal-combustion engine and clearance is provided between an end of the plurality of blades (17) and the interior wall (18).

4. The apparatus according to claim 1, wherein each of the plurality of blades (17) has a similar curvature and the curvature of each of the plurality of blades (17) is slanted in the same direction, relative to the rotational axis (7) of the rotor (9), to increase air flow through the gas centrifuge (1) during operation of the internal-combustion engine.

5. The apparatus according to claim 1, wherein the apparatus has a combustion air inlet and an annular channel (22) is provided remote from the combustion air inlet for receiving the oxygen-enriched combustion air ($O_2$) as the combustion air flow axially along the apparatus and the annular channel (22) has an outlet for supplying the oxygen-enriched combustion air ($O_2$) to the internal-combustion engine.

6. The apparatus according to claim 5, wherein a concentric partition (24) is located within the housing and the concentric partition (24) separates the annular channel (22) from the oxygen-depleted air ($N_2$) outlet.

7. The apparatus according to claim 6, wherein each one of the plurality of blades (17) of the rotor (9) has a slot (26) formed therein for accommodating the concentric partition (24) and facilitating rotation of the rotor (9) relative to the concentric partition (24).

8. The apparatus according to claim 5, wherein the housing (6) has a plurality of outlet openings (25) formed therein for discharging oxygen-depleted air ($N_2$) from the apparatus, and the plurality of outlet openings (25) are located between the rotational axis (7) of the rotor (9) and the annular channel (22).

9. The apparatus according to claim 1, wherein the apparatus has a combustion air inlet and an oxygen-depleted air ($N_2$) outlet, and an annular channel (22) is provided adjacent the oxygen-depleted air ($N_2$) outlet for receiving the oxygen-enriched combustion air ($O_2$) as the combustion air flows axially along the apparatus and the annular channel (22) has an outlet for supplying the oxygen-enriched combustion air ($O_2$) to the internal-combustion engine.

10. The apparatus according to claim 9, wherein a concentric partition (24) is located within the housing and the concentric partition (24) separates the annular channel (22) from the oxygen-depleted air ($N_2$) outlet.

11. The apparatus according to claim 10, wherein each one of the plurality of blades (17) of the rotor (9) has a slot (26) formed therein for accommodating the concentric partition (24) and facilitating rotation of the rotor (9) relative to the concentric partition (24).

12. The apparatus according to claim 9, wherein the oxygen-depleted air ($N_2$) outlet comprises a plurality of outlet openings (25) formed in the housing (6) for discharging the oxygen-depleted air ($N_2$) from the apparatus, and the plurality of outlet openings (25) are located between the rotational axis (7) of the rotor (9) and the annular channel (22).

13. The apparatus according to claim 1, wherein the housing (6) is connected to an exhaust pipe (4) of the internal-combustion engine such that the exhaust gas turbine (2) communicates with combustion exhaust gases (5), as the combustion exhaust gases (5) flow through the exhaust pipe (4), to drive the rotor (9).

14. The apparatus according to claim 13, wherein the rotational axis (7) of the rotor (9) and a rotational axis of the exhaust gas turbine (2) are coaxial with one another and both extend perpendicular to a direction of flow of the combustion exhaust gases (5) through the exhaust pipe (4).

15. The apparatus according to claim 13, wherein the exhaust gas turbine (2) is designed to rotate the rotor (9) at a rotational speed of about 80,000 revolutions per minute.

16. The apparatus according to claim 13, wherein the apparatus further comprises at least one radial bearing and at least one axial bearing to facilitate rotation of the rotor (9) and the exhaust gas turbine (2) within the apparatus.

17. An apparatus (1) for enriching an oxygen content of combustion air for an internal-combustion engine, the apparatus comprising a gas centrifuge (1) having a rotor (9) rotatably located within a housing (6) of the apparatus, the rotor (9) being connected to an exhaust gas turbine (2), the exhaust gas turbine (2) communicating with combustion exhaust gases (5) of the internal-combustion engine, and the combustion exhaust gases (5) of the internal-combustion engine driving the exhaust gas turbine (2) during operation of the internal-combustion engine;

wherein the rotor (9) has a plurality of blades (17) located for rotation within an interior of the housing (6) and the housing (6) defines a diameter in the interior where the plurality of blades rotate, and the plurality of blades have an axial length which is greater than the diameter of the interior of the housing where the plurality of blades rotate, whereby the rotor (9), during operation of the internal-combustion engine, rotates and applies a centrifugal force to combustion air, as the combustion air flows axially along the rotor (9), to force oxygen-enriched combustion air ($O_2$) radially away from a rotational axis (7) of the rotor (9) and facilitate separation of the oxygen-enriched combustion air ($O_2$) from a remainder of the combustion air;

each of the plurality of blades (17) has a similar curvature and the curvature of each of the plurality of blades (17) is slanted in the same direction, relative to the rotational axis (7) of the rotor (9), to increase air flow through the gas centrifuge (1) during operation of the internal-combustion engine; and the apparatus has a combustion air inlet and an oxygen-depleted air ($N_2$) outlet, and an annular channel (22) is provided adjacent the oxygen-depleted air ($N_2$) outlet for receiving the oxygen-enriched combustion air ($O_2$) as the combustion air flow axially along the apparatus and the annular channel (22) has an outlet for supplying the oxygen-enriched combustion air ($O_2$) to the internal-combustion engine.

18. The apparatus according to claim 17, wherein a concentric partition (24) is located within the housing and the concentric partition (24) separates the annular channel (22) from the oxygen-depleted air ($N_2$) outlet; and each one of the plurality of blades (17) of the rotor (9) has a slot (26) formed therein for accommodating the concentric partition (24) and facilitating rotation of the rotor (9) relative to the concentric partition (24).

19. The apparatus according to claim 17, wherein the oxygen-depleted air ($N_2$) outlet comprises a plurality of outlet openings (25) formed in the housing (6) for discharging the oxygen-depleted air ($N_2$) from the apparatus, and the plurality of outlet openings (25) are located between the rotational axis (7) of the rotor (9) and the annular channel (22); and the housing (6) is connected to an exhaust pipe (4) of the internal-combustion engine such that the exhaust gas turbine (2) communicates with combustion exhaust gases (5), as the combustion exhaust gases (5) flow through the exhaust pipe (4), to drive the rotor (9).

20. An apparatus (1) for enriching an oxygen content of combustion air for an internal-combustion engine, the apparatus comprising a gas centrifuge (1) having a rotor (9) rotatably located within a housing (6) of the apparatus, the rotor (9) being connected to an exhaust gas turbine (2), the exhaust gas turbine (2) communicating with combustion exhaust gases (5) of the internal-combustion engine, and the combustion exhaust gases (5) of the internal-combustion engine driving the exhaust gas turbine (2) during operation of the internal-combustion engine;

wherein the rotor (9) has a plurality of blades (17) located for rotation within an interior of the housing (6) and the housing (6) defines a diameter in the interior where the plurality of blades rotate, and the plurality of blades have an axial length which is greater than twice the diameter of the interior of the housing where the plurality of blades rotate, whereby the rotor (9), during operation of the internal-combustion engine, rotates and applies a centrifugal force to combustion air, as the combustion air flows axially along the rotor (9), to force oxygen-enriched combustion air ($O_2$) radially away from a rotational axis (7) of the rotor (9) and facilitate separation of the oxygen-enriched combustion air (O$_2$) from a remainder of the combustion air;

each of the plurality of blades (17) has a similar curvature and the curvature of each of the plurality of blades (17) is slanted in the same direction, relative to the rotational axis (7) of the rotor (9), to increase air flow through the gas centrifuge (1) during operation of the internal-combustion engine;

the apparatus has a combustion air inlet and an oxygen-depleted air (N$_2$) outlet, and an annular channel (22) is provided adjacent the oxygen-depleted air (N$_2$) outlet for receiving the oxygen-enriched combustion air (O$_2$) as the combustion air flow axially along the apparatus and the annular channel (22) has an outlet for supplying the oxygen-enriched combustion air (O$_2$) to the internal-combustion engine;

a concentric partition (24) is located within the housing and the concentric partition (24) separates the annular channel (22) from the oxygen-depleted air (N$_2$) outlet;

each one of the plurality of blades (17) of the rotor (9) has a slot (26) formed therein for accommodating the concentric partition (24) and facilitating rotation of the rotor (9) relative to the concentric partition (24);

the oxygen-depleted air (N$_2$) outlet comprises a plurality of outlet openings (25) formed in the housing (6) for discharging the oxygen-depleted air (N$_2$) from the apparatus, and the plurality of outlet openings (25) are located between the rotational axis (7) of the rotor (9) and the annular channel (22); and the housing (6) is connected to an exhaust pipe (4) of the internal-combustion engine such that the exhaust gas turbine (2) communicates with combustion exhaust gases (5), as the combustion exhaust gases (5) flow through the exhaust pipe (4), to drive the rotor (9).

\* \* \* \* \*